(12) United States Patent
Schmidt et al.

(10) Patent No.: US 7,478,380 B2
(45) Date of Patent: Jan. 13, 2009

(54) DYNAMICALLY UPDATABLE AND EASILY SCALABLE COMMAND LINE PARSER USING A CENTRALIZED DATA SCHEMA

(75) Inventors: David Schmidt, Round Rock, TX (US); Anusha Ragunathan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 633 days.

(21) Appl. No.: 10/988,961

(22) Filed: Nov. 15, 2004

(65) Prior Publication Data
US 2006/0129980 A1    Jun. 15, 2006

(51) Int. Cl.
*G06F 9/44* (2006.01)
*G06F 15/173* (2006.01)
(52) U.S. Cl. ............... 717/162; 717/114; 709/223
(58) Field of Classification Search ............... None
See application file for complete search history.

(56) References Cited

U.S. PATENT DOCUMENTS

| | | | |
|---|---|---|---|
| 5,687,378 A | 11/1997 | Mulchandani et al. ...... 395/708 |
| 6,138,098 A | 10/2000 | Shieber et al. ............... 704/257 |
| 6,321,287 B1 | 11/2001 | Rao et al. ..................... 710/260 |
| 6,421,671 B1 | 7/2002 | Bryan et al. .................. 707/10 |
| 6,470,446 B1 | 10/2002 | Beelitz et al. ................. 713/2 |
| 6,591,418 B2 | 7/2003 | Bryan et al. ............... 717/177 |
| 6,609,213 B1 | 8/2003 | Nguyen et al. ................. 714/4 |
| 6,625,590 B1 | 9/2003 | Chen et al. ..................... 707/1 |
| 6,640,278 B1 | 10/2003 | Nolan et al. .................. 711/6 |
| 6,671,820 B1 | 12/2003 | Kelman ........................ 714/4 |
| 6,687,835 B1 | 2/2004 | Hirano et al. ............... 713/202 |
| 6,718,381 B1 | 4/2004 | Herzi ........................ 709/224 |
| 6,724,408 B1 | 4/2004 | Chen et al. .................. 345/853 |
| 6,738,781 B1 | 5/2004 | Mustoe et al. ............. 707/102 |
| 6,871,346 B1 * | 3/2005 | Kumbalimutt et al. ....... 718/104 |
| 7,054,924 B1 * | 5/2006 | Harvey et al. ............... 709/220 |
| 2004/0103178 A1 * | 5/2004 | O'Hara et al. .............. 709/223 |
| 2005/0060693 A1 * | 3/2005 | Robison et al. ............. 717/143 |

* cited by examiner

*Primary Examiner*—Eric B Kiss
*Assistant Examiner*—Ben C Wang
(74) *Attorney, Agent, or Firm*—Hamilton & Terrile, LLP; Stephen A. Terrile

(57) ABSTRACT

A method for interfacing with a command line interface utility which includes defining a data schema for command line interface data, defining a command line interface option object using the data schema, and linking the command line interface option object to a command line interface function to interact with a system management function.

17 Claims, 10 Drawing Sheets

| # | CLI Object | Description |
|---|---|---|
| 1 | Option ID | Unique identification number for the object |
| 2 | Name | The option name as it should be given on the command line |
| 3 | Alias | Alias is the option name that can be given on the command line |
| 4 | Help description | Description is displayed when help information is requested about the option |
| 5 | Option flags | Option flags contains information associated with the CLI object used to implement the option. |
| 6 | Option data | Option data contains generic option information that can be used by the validation and operation functions. This is a hex-encoded string that can contain modeling information necessary for the option to perform its operation |
| 7 | Option dependency | Other CLI options that this option is dependent on. This is a list of option ids that the option should have in order to proceed |
| 8 | Option parameter | The option parameter union can contain either a list of valid string arguments or a list of option objects that are accepted as sub cmds |
| 9 | Argument flags | These flags describe the argument type (subcommands or simple argument) and whether or not the argument is required |
| 10 | Validation function ID | The validation function id identifies the function that will be called to validate the command line input |
| 11 | Operation function ID | The operation function id identifies the function that will be called to implement the command line input |

(310 — table; rows labeled 312, 314, 316, 318, 320, 322, 324, 326, 328, 330)

| # | CLI Object | Description |
|---|---|---|
| 1 | Option ID | Unique identification number for the object |
| 2 | Name | The option name as it should be given on the command line |
| 3 | Alias | Alias is the option name that can be given on the command line |
| 4 | Help description | Description is displayed when help information is requested about the option |
| 5 | Option flags | Option flags contains information associated with the CLI object used to implement the option. |
| 6 | Option data | Option data contains generic option information that can be used by the validation and operation functions. This is a hex-encoded string that can contain modeling information necessary for the option to perform its operation |
| 7 | Option dependency | Other CLI options that this option is dependent on. This is a list of option ids that the option should have in order to proceed |
| 8 | Option parameter | The option parameter union can contain either a list of valid string arguments or a list of option objects that are accepted as sub cmds |
| 9 | Argument flags | These flags describe the argument type (subcommands or simple argument) and whether or not the argument is required |
| 10 | Validation function ID | The validation function id identifies the function that will be called to validate the command line input |
| 11 | Operation function ID | The operation function id identifies the function that will be called to implement the command line input |

*Figure 3*

```
<argument_list>
   <argument val="0x00b1">enable</argument>
   <argument val="ocoob2">disable</argument>
</argument_list>

<argument_list>
   <argument val="0x00c1">enable</argument>
   <argument val="ocooc2">disable</argument>
</argument_list>
```

DYNAMICALLY UPDATABLE AND EASILY SCALABLE COMMAND LINE PARSER USING A CENTRALIZED DATA SCHEMA

BACKGROUND OF THE INVENTION

1. Field of the Invention

The present invention relates to command line input to server systems management utilities and more particularly to dynamically updating and scaling a command line parser using a centralized data schema.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can include subsystems that monitor the physical health characteristics of system components, such as temperature, voltage, fans, power suppliers and chassis intrusion. Subsystems can also store system level administration information such as warranty information for a system or a date of purchase or manufacture. Subsystems can also store enclosure level administration information such as a number of available memory slots and a number of used memory slots. Such subsystems can also monitor hardware detected faults in the operation of the system components. Conventional monitoring subsystems can be configured by specific commands that set variables associated with the operation of those subcomponents. These commands may be generated via a command line utility.

It is desirable for a command line utility to contain code to parse the command line input, validate the input, and perform some task based on the content of the input. The input generally includes an option, usually denoted by a delimiter such as '/' in a DOS environment or '—' in a Linux environment, and an argument to the option. Together this option/argument pair provides a command line interface (CLI) command. In some cases the argument to the option may be optional, making the option the only component of a command. Many commands may be included within a particular command line.

There are many known parsing solutions. However, known parsing solutions present a number of challenges. For example, data relating to CLI options may be distributed in the code of the utility, making it harder to completely define within a command the behavior of a CLI command. For example, one module may contain the string name of the option, while one module may contain the argument string for the option, while yet another module might contain the data to manipulate if this option is given on the command line. Thus, adding new CLI options can be tedious, repetitive and distributed. If a developer wants to change the name of a CLI option, the argument to the option from mandatory to optional, and the action when the option is given as input, then the developer would need to make changes to three different sections of code within the utility.

Another challenge of known parsing solutions relates to limitations in providing scalability with multiple CLI option levels. Some CLI applications have many levels of commands called subcommands. For example, a baseboard management controller (BMC) configuration utility has commands grouped for configuring a local area network (LAN) channel, a serial channel and Event Filters. The LAN option in turn has sub-options, such as ipaddress, gateway, and subnetmask, which may be represented in command line as:

bmccfg lancfgparams—ipaddress
    bmccfg lancfgparams—gateway
    bmccfg lancfgparams—subnetmask Known parsing solutions parse the first level of commands, pass the information to the implementation modules, and then begin a second parsing operation for the subcommands. With this approach, the amount of distributed CLI data may be multiplied by the number of sub commands.

Another challenge of known parsing solutions is that compile time coupling of CLI options with corresponding data restricts maintenance of the application. Known parsing solutions perform a compile time coupling of command line options to corresponding implementation data. If data changes or needs to be removed from the utility (due to, for example, broken function), then the utility would generally require recompilation and redistribution. Recompilation often lengthens the test-debug-fix cycle and complicates patch management during maintenance of the utility. Any change to the CLI would require a new release of the code.

One solution to the parsing and scaling of command line instructions is disclosed in O'Hara, U.S. Patent Application Publication No. 2004/0103178 A1, entitled "Information Handling System and Method for Multilevel Command Implementation" (O'Hara). O'Hara discloses a process for transforming name/value pairs from the command line to name/value pairs for back-end libraries and routing these new pairs to the appropriate library. O'Hara discloses a second level of command line parsing within the back-end libraries as well as statically linking the code that validates and applies the command to the name/value pairs.

SUMMARY OF THE INVENTION

In accordance with the invention, a data schema and processing algorithm for defining and using CLI data is set forth. The data schema and processing algorithm allows a supplier to simplify support of CLI utilities across the entire product development lifecycle. The data schema and processing algorithm provides strategic and defensive benefits to a supplier as the schema and processing algorithm protects CLI products and provides a supplier with a unique method of updating and developing future utilities.

The data schema and processing algorithm provides advantages across a software development cycle of developing the software, testing the software and releasing and maintaining the software. During the development portion of the development cycle, the data schema and processing algorithm enables easy design and authoring of CLI utilities by providing a central location for edits to the code of the CLI utility thus easing distribution of the developed CLI utility, enables the same parsing module to be used for all commands and subcommands thus enhancing scalability and enables upgrade of CLI utilities without the need for recompilation thus easing compile time linking. During the test portion of the development cycle, the data schema and processing algorithm enables easy modification of code of the CLI utility to address usability issues, types, as well as easy modification of CLI utility to fix defects or bugs within the CLI utility, allows test teams to use automated test tools and build verification scripts to use option definitions to test a CLI utility thus enhancing scalability, and minimizes defect fix turnaround time by enabling a single binary of a CLI utility so that only the configuration file is revised thus easing compile time linking. During the release and maintenance portion of the development cycle, the data schema and processing algorithm enhances sustaining engineering of the CLI utility with little knowledge of the underlying CLI utility code thus enhancing distribution and scalability of the CLI utility and enables patches to the CLI utility with minimal risk as the underlying CLI utility need not be recompiled.

In one embodiment, the invention relates to a method for interfacing with a command line interface utility which includes defining a data schema for command line interface data, defining a command line interface option object using the data schema, and linking the command line interface option object to a command line interface function to interact with a system management function.

In another embodiment, the invention relates to an apparatus for interfacing with a command line interface utility which includes means for defining a data schema for command line interface data, means for defining a command line interface option object using the data schema, and means for linking the command line interface option object to a command line interface function to interact with a system management function.

In another embodiment, the invention relates to an information handling system which includes a processor and a memory coupled to the processor. The memory stores a command line interface utility and a command line interface object. The command line interface object includes command line interface data. The command line interface data conforms to a data schema. The command line interface utility is linked to the command line interface object and the utility interfaces with a system management function.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 shows a table representation of a command line interface schema.

DETAILED DESCRIPTION

Figure 1:
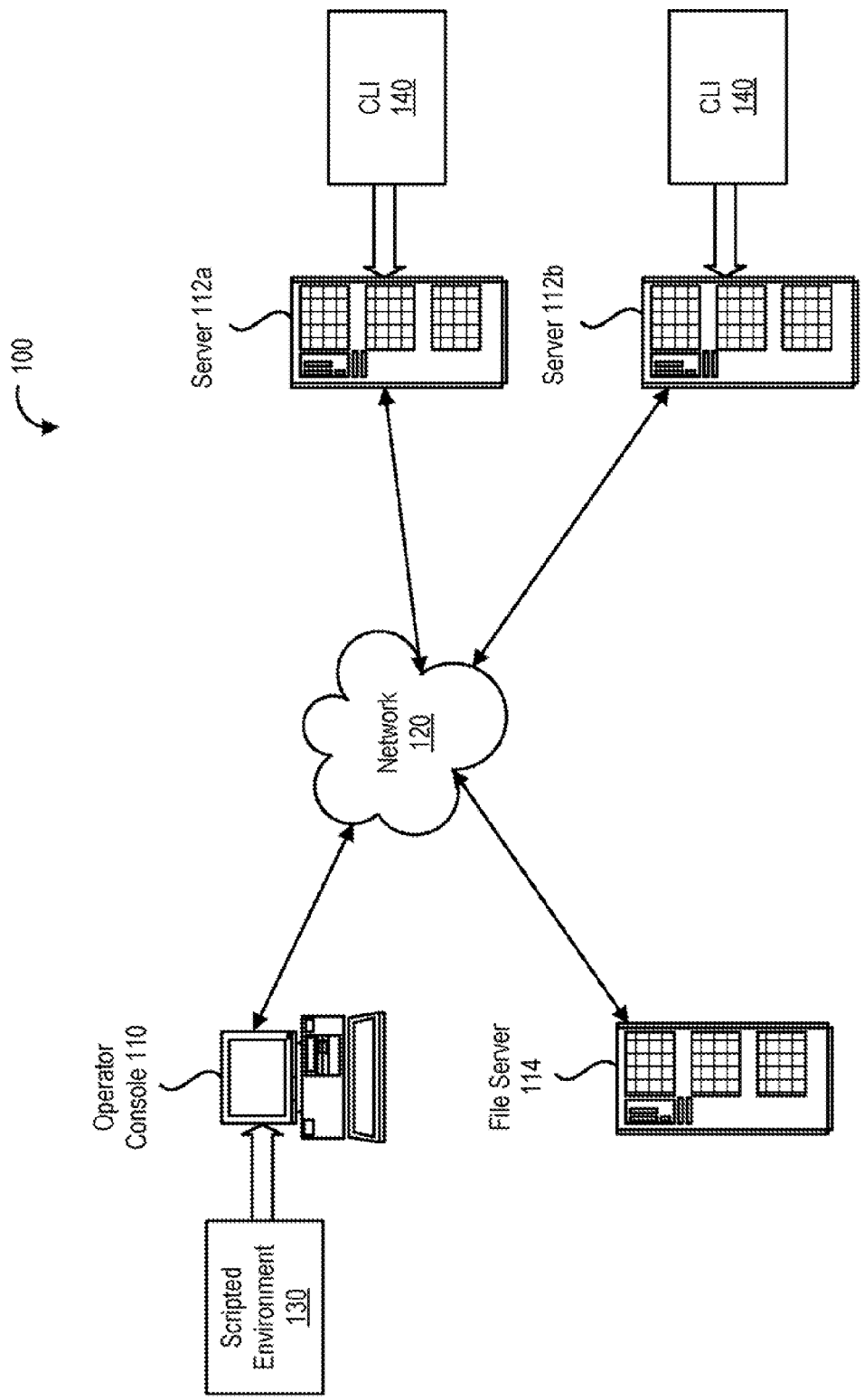
FIG. 1 shows a block diagram of a server environment in which a command line utility is used.

Referring to FIG. 1, a block diagram of a server environment 100 in which a command line interface (CLI) utility is used is shown. More specifically, the server environment includes an operator console 110, one or more server systems 112a, 112b as well as optionally a file server 114. The operator console 110, network devices 112 and file server 114 are all coupled via a network 120.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components. The operator console 110, server systems 112a, 112b and file server 114 are all examples of information handling systems.

The operator console 110 includes a scripted environment 130 that invokes a command line interface utility function 140 that resides on the servers 112a, 112b. The command line interface utility function 140 includes a predefined data schema as well as a processing algorithm for defining and using CLI data. The data schema and processing algorithm allows a supplier to simplify support of CLI utilities across the entire product development lifecycle. The data schema and processing algorithm provides strategic and defensive benefits to a supplier as the schema and processing algorithm protects CLI products and provides a supplier with a unique method of updating and developing future utilities.

All information related to a CLI option is included within a single, centralized CLI object data definition defined by the command line interface data schema. This object structure contains fields for the option name (as it should be given on the command line), help description, and the subcommands or arguments that it accepts. It also contains a function id for the input validation function, and a function id for applying the input to the system. When the object is given on the command line, the validation function is called. If the validation function passes, the operation function is called and the specific operation of the CLI option is performed.

The option object defines all of the data needed to validate and perform the option's main function. By validating and performing the option's main function, the validation function and operation function can be generic across a set of common option objects. Any changes to the option do not require changes to the actual code paths. For example, the validation and operation functions for changing BIOS CMOS settings can be generic, while the option object definitions can contain the actual CMOS indices and page values.

Figure 2:
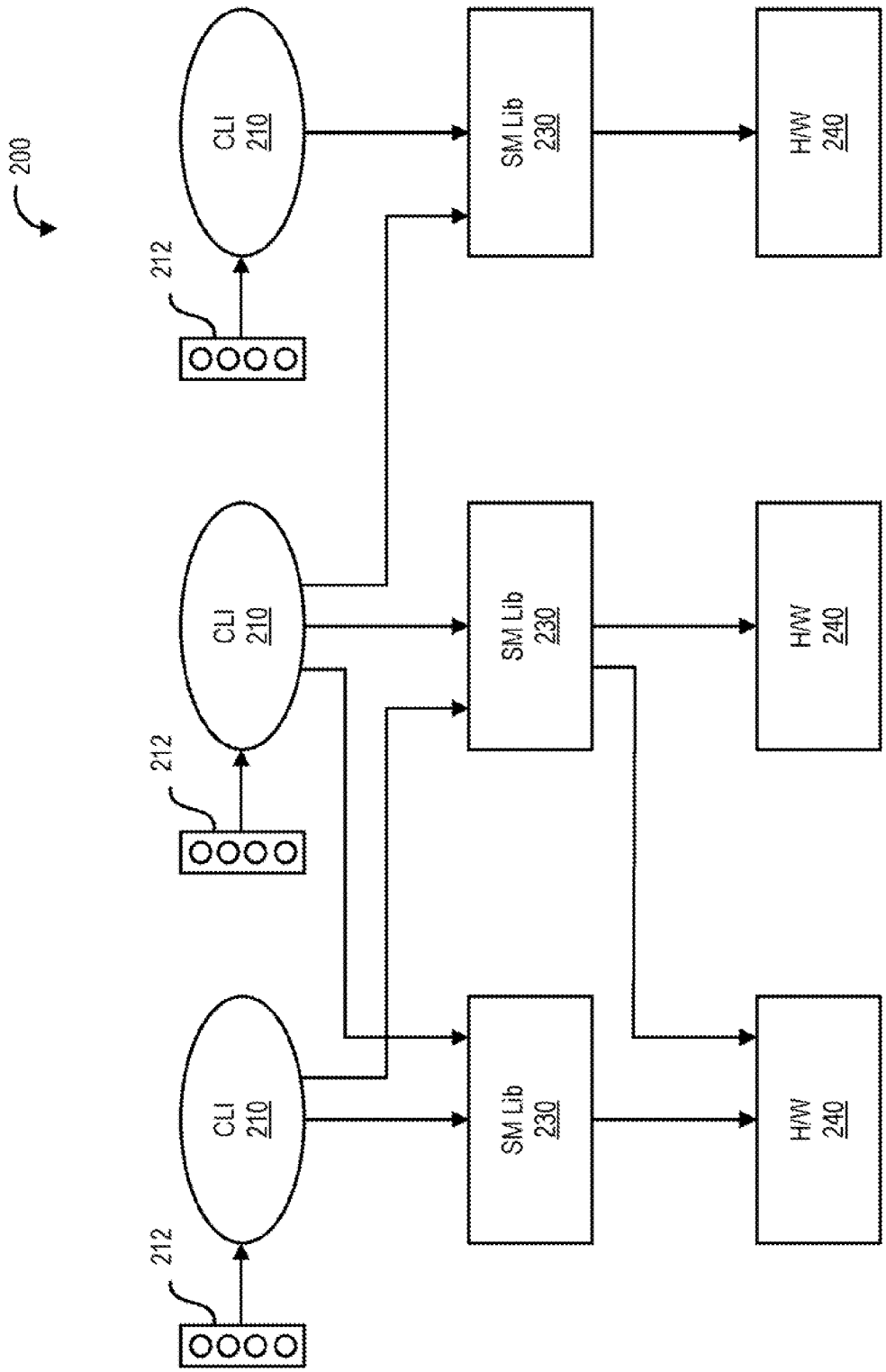
FIG. 2 shows a hierarchical block diagram of a system which includes a command line utility.

Referring to FIG. 2, a hierarchical block diagram of a system 200 which includes a command line utility is shown. More specifically, the system 200 includes a plurality of command line interface utilities 210, each of which includes a corresponding collection of command line interface option objects 212. A command line interface utility 210 and a command line interface option object 212 provide a command line utility function 140.

Each of the command line interface utilities 210 interface with one or more system management libraries 230. The system management libraries 230 interface with one or more hardware modules 240. Examples of hardware modules include, for example, a memory on which a basic input output system (BIOS) is stored, a baseboard management controller (BMC) module, a non-volatile RAM module, etc. The system management libraries 230 include the code used to interacting with and modifying information within particular portions of certain modules. For example, a system management library might include the code for modifying power management functions within one or more hardware modules 240. The system management libraries 230 receive information from a command line interface utility and pass the appropriate information to the appropriate hardware module.

Referring to FIG. 3, a chart of a command line interface object structure 300 is shown. The command line interface object structure 300 includes a plurality of command line interface elements. More specifically, the command line interface elements includes an option identification element 310, a name element 312, an alias element 314, a help description element 316, an option flags element 318, an option data element 320, an option dependency element 322, an option parameter element 324, an argument flags element 326, a validation function identification element 328 and an operation function identification element 330.

The option identification element 310 provides a unique identification number of the object. The name element 312 provides the option name as it is presented on the command line. The alias element 314 provides aliases for the option name that can be provided on the command line. The help description element 316 is a description that is displayed when help information is requested about the option.

The option flags element 318 contains information associated with the CLI object used to implement the option. For example, this flag can be sued to hold interface information that an application can use when implementing the command. The option data element 320 contains generic option information that can be used by the validation and operation functions of the command line interface utility. The option data element 320 is a hex encoded string that can contain modeling information necessary to the option to perform its parameters. The option dependency element 322 includes information regarding other CLI option upon which the particular CLI option is dependent. The option dependency element 322 includes a list of option identifiers that the option should have to proceed. The option parameter element 324 can contain either a list of valid string arguments or a list of option objects that are accepted as sum commands.

The argument flags element 326 includes flags that describe an argument type and whether or not the argument is required. The argument type includes subcommand type arguments or simple argument type arguments. The validation function identification element 328 identifies a function that will be called to validate the command line input. The operation function identification element 330 identifiers the function that will be called to implement to command line input.

With a command line interface object structure 300, CLI utilities that use subcommands can simply define option objects that define the subcommands and place them inside the main option object. For example, the command line interface object structure includes an option parameter element. This field is a union that can contain either a list of valid string arguments to the CLI option or a list of option objects that are accepted as subcommands to the CLI option. When the CLI option has subcommands, then the object definition can be easily expanded to follow the same data modeling as the main option. Thus, the command line object structure 300 is scalable and can accommodate any depth of subcommands. Subcommand options can in turn have subcommand options; there is no limit to the amount of recursion in command line options.

Figure 4:
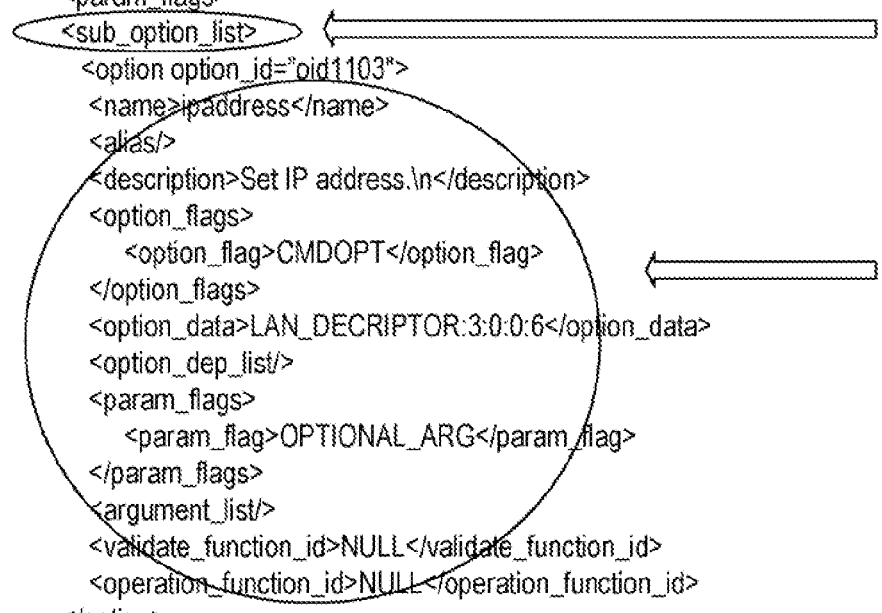
FIG. 4 shows an example of how the schema is scalable.

Referring to FIG. 4, an example of a command line interface 400 in which the parser and schema are scalable is shown. More specifically, by using a sub-option indicator 410 within the option flags object 318, a command line interface utility may indicate that a particular command line interface includes sub-options. The command line interface 400 that includes sub-options includes a sub-option list identifier 420 that shows the beginning of a list of potential sub-options within the command line interface. A sub-option 430 within the sub-option list includes a structure that is substantially similar to a structure within a main option.

Thus the CLI object can be easily scaled to accommodate sub-options. The structure of the sub-option is the same as that of the main option, "lancfgparams."

All command line option objects and the properties of the command line option objects are defined in a repository file (which can be, e.g., an XML implementation). Compile time coupling of this repository with the CLI utility is not required. This repository may be transformed into a resource file and linked with the binary executable, or it can be read by the CLI utility at run-time. This model allows developers to redefine the user interface and data to perform system commands without requiring a recompilation.

Figure 5A:
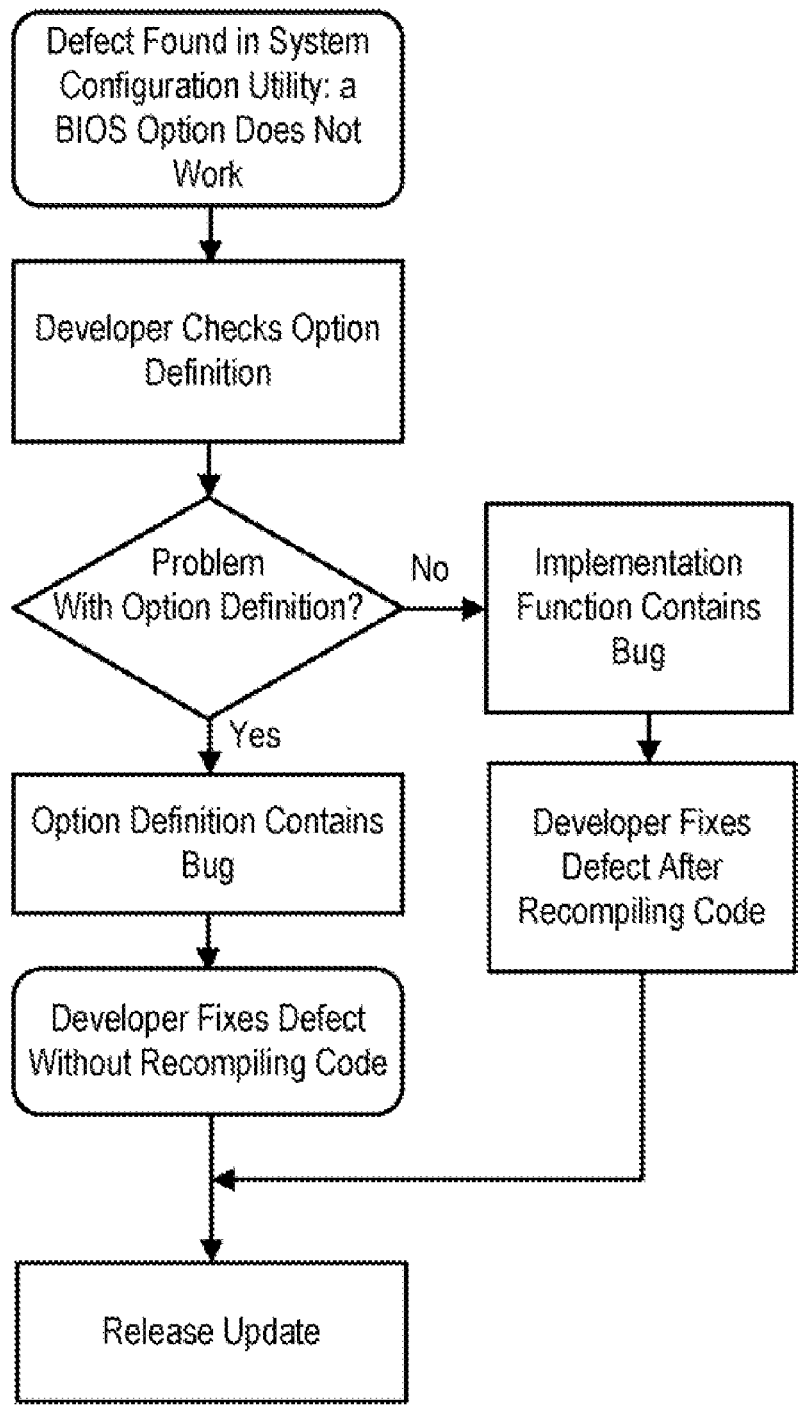
FIGS. 5A and 5B, generally referred to as FIG. 5, show examples of the operation of how a defect within a system configuration utility is addressed using a command line utility.
Figure 5B:
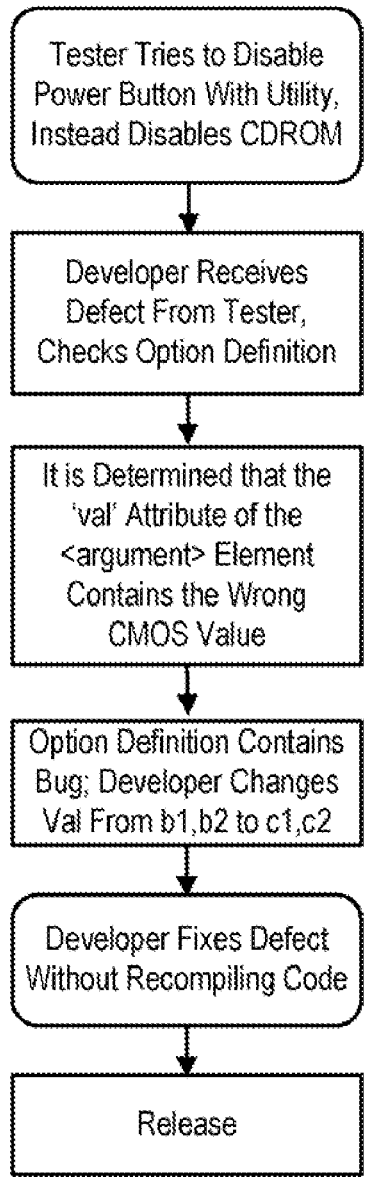

Referring to FIGS. 5A and 5B examples of the operation of how a defect within a system configuration utility is addressed using a command line utility are shown. In this example, the repository can be used to fix a defect without recompiling the code of the command line utility. In this example, the CMOS values of the enable/disable options have been incorrectly defined. After recognizing this error, the developer simply changes the values and distributes the new modified option definition with the CLI utility. Depending on the build configuration, the option definition list can be re-linked with the code or supplied to the CLI utility at run-time.

Figure 6A:
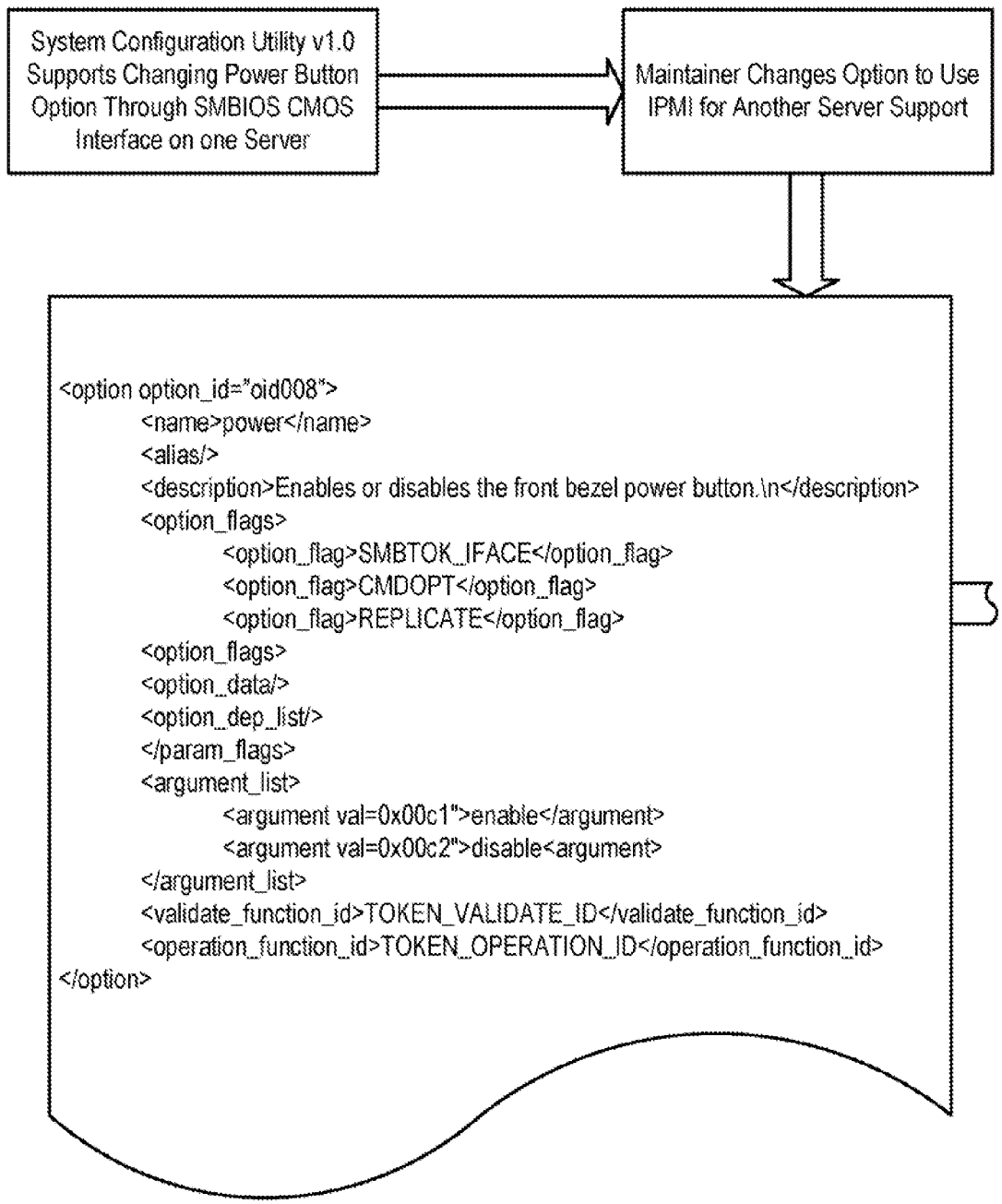
FIGS. 6A and 6B, generally referred to as FIG. 6, show an example of a patch management solution.
Figure 6B:
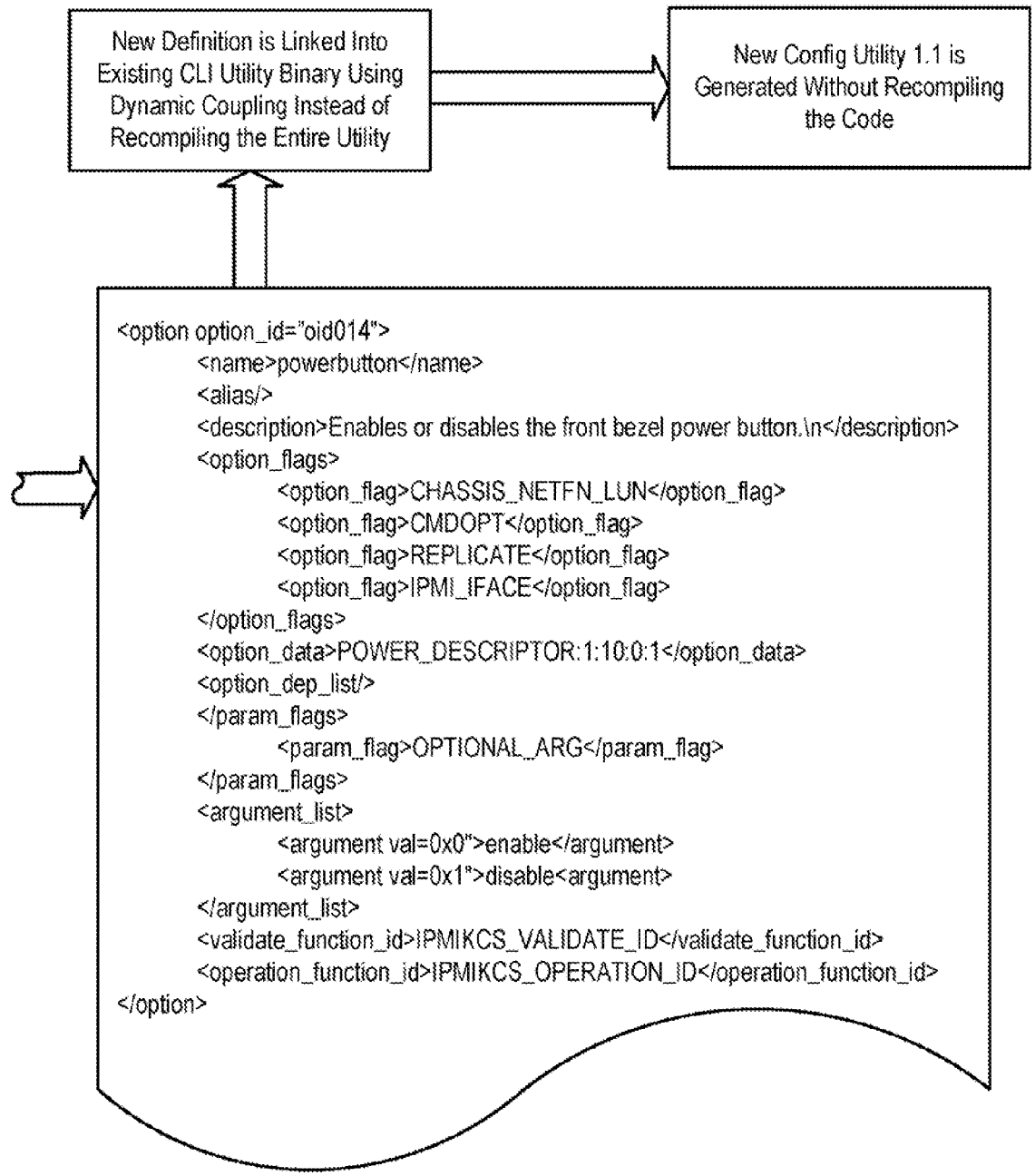

FIGS. 6A and 6B, generally referred to as FIG. 6, show an example of a patch management solution. The predefined data schema as well as a processing algorithm for defining and using CLI data assists with patch management. For example, while some servers might use a system management basic input output system (SMBIOS) CMOS token interface for implementing a power button enable/disable feature, in other servers this same feature is implemented using an intelligent platform management interface keyboard controller style (IPMI KCS) interface. Because there is a generic validation and operation function for each hardware interface, switching the CLI option from the SMBIOS interface to the IPMI interface is straightforward. Using the predefined data schema and processing algorithm, the XML record for the appropriate CLI option object definition is modified. Once the option definition has been modified, the modified option object definition is provided to the CLI utility without the need for a recompilation.

Figure 7:
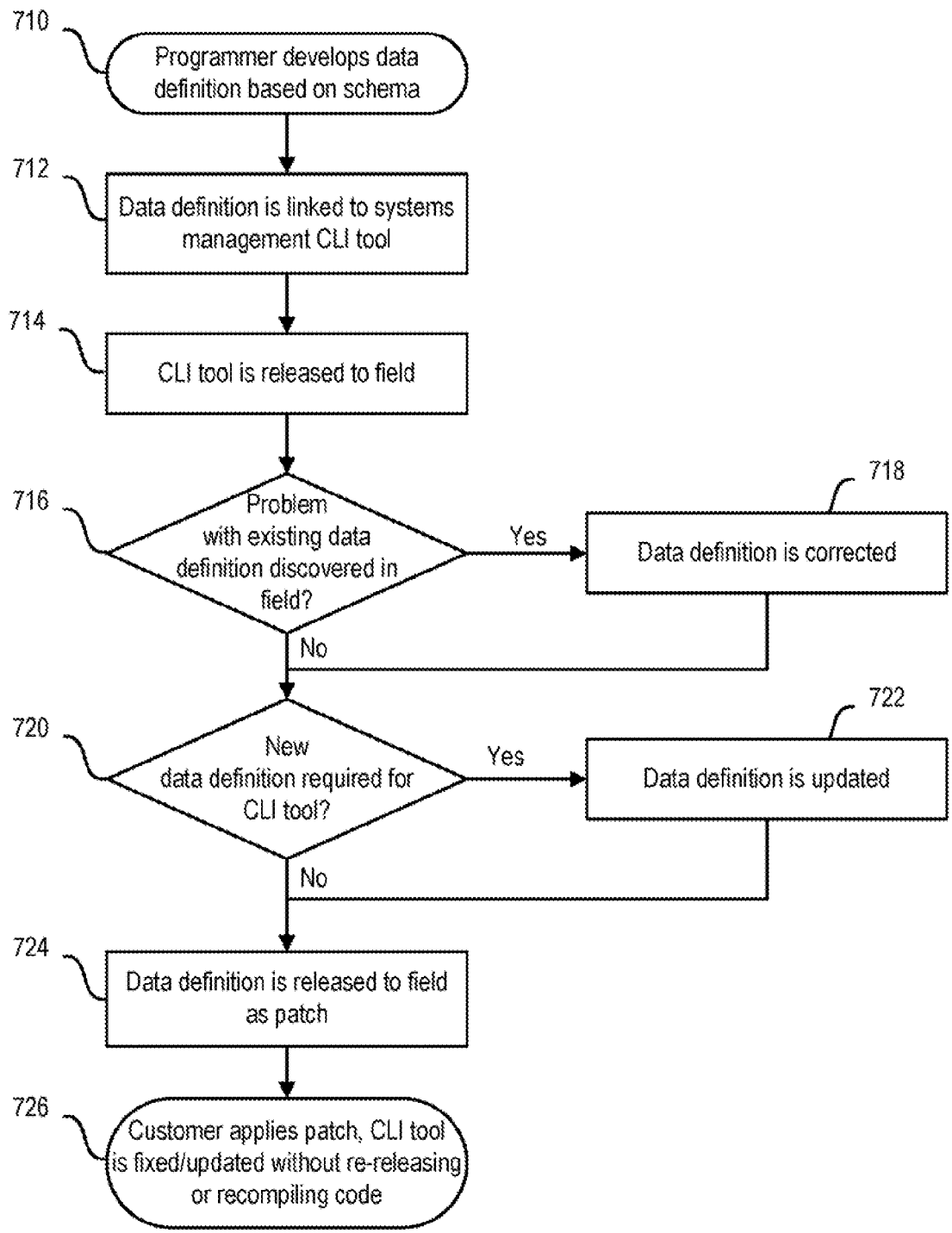
FIG. 7 shows a flow chart of a process for using a command line interface data schema.

FIG. 7 shows a flow chart of a process for using a command line interface data schema. More specifically, a programmer develops a data definition that conforms to the predefined data schema at step 710. The data definition is then linked to an appropriate systems management CLI tool at step 712. The CLI tool is then released to the field (i.e., the CLI tool is available for use) at step 714.

Next, if a problem is discovered with an existing data definition as determined by step 716 then the data definition is corrected at step 718. If no problem is discovered, then it is determined whether a new data definition is required for a CLI tool at step 720. If a new data definition is required, then the data definition is updated at step 722.

Next, the data definition is released to a field as a patch at step 724. The customer then applies the patch the CLI tool such that the CLI tool is updated without the need to re-release or recompile the underlying code for the CLI tool at step 726.

Figure 8:
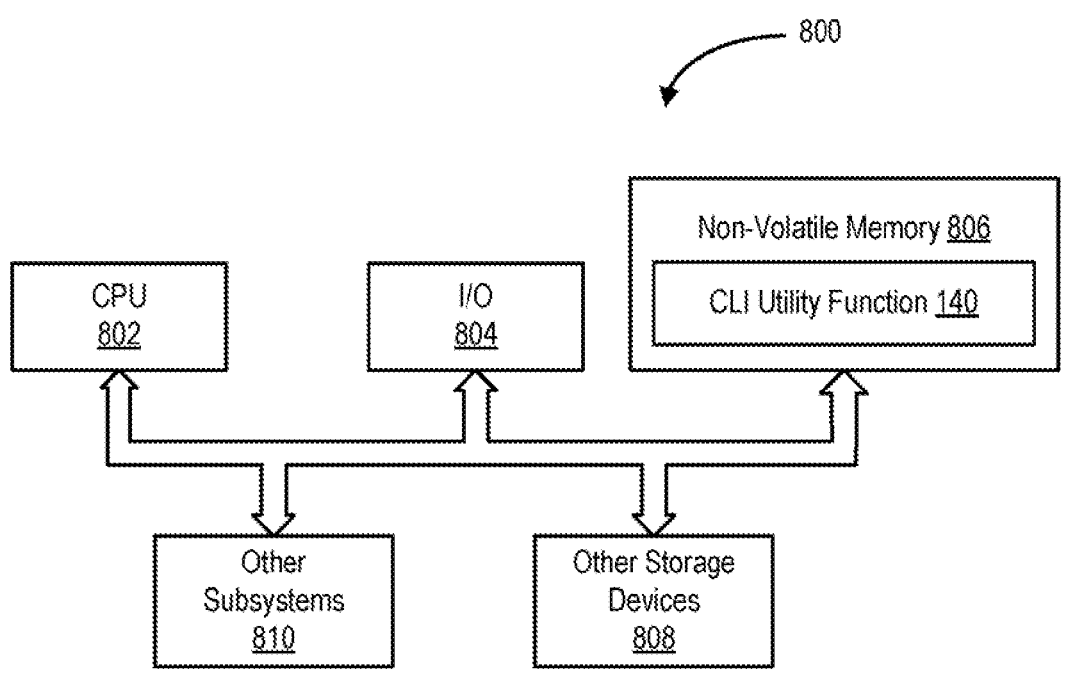
FIG. 8 shows a system block diagram of an information handling system.

Referring to FIG. 8, a block diagram of an information handling system 800 is shown. The information handling system includes a processor 802, input/output (I/O) devices 804, such as a display, a keyboard, a mouse, and associated controllers, non volatile memory 806 such as a hard disk drive, and other storage devices 808, such as a floppy disk and drive and other memory devices, and various other subsystems 810, all interconnected via one or more buses 812. The software is installed onto the non volatile memory 806. Alternately, the software may be installed onto any appropriate non-volatile memory. The non-volatile memory 806 may also store the CLI utility function 140.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, it will be appreciated that other information handling systems in addition to a server may use a predefined data schema as well as a processing algorithm for defining and using CLI data.

Also for example, it will be appreciated that other combinations of command line utilities and command line utility option objects are contemplated. For example, one command line utility option object might correspond to a plurality of command line utilities or a plurality of command line utility option objects might correspond to one command line utilities. Also for example, some command line utilities might have corresponding command line utility option objects while other command line utilities within a system do not.

Also for example, the above-discussed embodiments include modules that perform certain tasks. The modules discussed herein may include hardware modules or software modules. The hardware modules may be implemented within custom circuitry or via some form of programmable logic device. The software modules may include script, batch, or other executable files. The modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for interfacing with a command line interface utility comprising:
    defining a data schema for command line interface data;
    defining a command line interface option object using the data schema; and,
    linking the command line interface option object to a command line interface function to interact with a system management function; and wherein
    the command line interface option object includes an option identification element, a name element, an alias element, a help description element, an option flags element, an option data element, an option dependency element, an option parameter element, an argument flags element, a validation function identification element and an operation function identification element.

2. The method of claim 1 wherein:
    the data schema controls how to expose a command line interface option to a user.

3. The method of claim 1 wherein:
    the command line interface option object interacts with a command line interface utility without recompiling the command line interface utility.

4. The method of claim 1 wherein:
    the command line interface function includes a command line interface utility.

5. The method of claim 1 wherein:
the linking includes linking the command line interface object to a plurality of command line interface functions, the plurality of command line interface functions interacting with a plurality of system management functions.

6. The method of claim 1 wherein:
the system management function interfaces with a hardware module of an information handling system.

7. An apparatus for interfacing with a command line interface utility comprising processor:
means for defining a data schema for command line interface data;
means for defining a command line interface option object using the data schema; and,
means for linking the command line interface option object to a command line interface function to interact with a system management function; and wherein
the command line interface option object includes an option identification element, a name element, an alias element, a help description element, an option flags element, an option data element, an option dependency element, an option parameter element, an argument flags element, a validation function identification element and an operation function identification element.

8. The apparatus of claim 7 wherein:
the data schema controls how to expose a command line interface option to a user.

9. The apparatus of claim 7 wherein:
the command line interface option object interacts with a command line interface utility without recompiling the command line interface utility.

10. The apparatus of claim 7 wherein:
the command line interface function includes a command line interface utility.

11. The apparatus of claim 7 wherein:
the linking includes linking the command line interface object to a plurality of command line interface functions, the plurality of command line interface functions interacting with a plurality of system management functions.

12. The apparatus of claim 7 wherein:
the system management function interfaces with a hardware module of an information handling system.

13. An information handling system comprising:
a processor; and
a memory coupled to the processor, the memory storing a command line interface utility and a command line interface object, the command line interface object including command line interface data, the command line interface data conforming to a data schema, the command line interface utility being linked to the command line interface object, the command line interface utility interfacing with a system management function; and wherein
the command line interface object includes an option identification element, a name element, an alias element, a help description element, an option flags element, an option data element, an option dependency element, an option parameter element, an argument flags element, a validation function identification element and an operation function identification element.

14. The information handling system of claim 13 wherein:
the data schema controls how to expose a command line interface option to a user.

15. The information handling system of claim 13 wherein:
the command line interface object interacts with the command line interface utility without recompiling the command line interface utility.

16. The information handling system of claim 13 wherein:
the command line interface utility interacts with a plurality of system management functions.

17. The information handling system of claim 13 wherein:
the system management function interfaces with a hardware module of the information handling system.

* * * * *